United States Patent
Auker et al.

(10) Patent No.: US 10,312,781 B2
(45) Date of Patent: Jun. 4, 2019

(54) MULTIPLE COIL ELECTRIC GENERATOR IN TURBINE ENGINE

(71) Applicant: Rolls-Royce North American Technologies, Inc., Indianapolis, IN (US)

(72) Inventors: Bradley Eugene Auker, Coatesville, IN (US); Edward Claude Rice, Indianapolis, IN (US)

(73) Assignee: Rolls-Royce North American Technologies, Inc., Indianapolis, IN (US)

(*) Notice: Subject to any disclaimer, the term of this patent is extended or adjusted under 35 U.S.C. 154(b) by 0 days.

(21) Appl. No.: 15/286,165

(22) Filed: Oct. 5, 2016

(65) Prior Publication Data
US 2018/0097427 A1     Apr. 5, 2018

(51) Int. Cl.
| H02K 16/02 | (2006.01) |
| H02K 1/27 | (2006.01) |
| H02K 1/12 | (2006.01) |
| H02K 7/18 | (2006.01) |
| H02K 21/12 | (2006.01) |

(52) U.S. Cl.
CPC .......... *H02K 16/02* (2013.01); *H02K 1/12* (2013.01); *H02K 1/27* (2013.01); *H02K 7/1823* (2013.01); *H02K 21/12* (2013.01)

(58) Field of Classification Search
CPC ............ H02K 16/02; H02K 1/12; H02K 1/27; H02K 7/1823
See application file for complete search history.

(56) References Cited

U.S. PATENT DOCUMENTS

| 4,260,944 A * | 4/1981 | O'Mahony | H02K 16/02 310/111 |
| 6,201,331 B1 | 3/2001 | Nakano | |
| 6,249,058 B1 | 6/2001 | Rea | |
| 6,710,492 B2 * | 3/2004 | Minagawa | H02K 16/02 310/113 |

(Continued)

FOREIGN PATENT DOCUMENTS

| CN | 102290936 A | 12/2011 |
| EP | 2727840 A2 | 5/2014 |

(Continued)

OTHER PUBLICATIONS

CN102290936 English Translation.*

(Continued)

*Primary Examiner* — Viet P Nguyen
(74) *Attorney, Agent, or Firm* — Shumaker & Sieffert, P.A.

(57) ABSTRACT

A turbine engine is described that includes a drive shaft and an electric generator, wherein the electric generator includes a first rotating element comprising a first magnet array and mechanically coupled to the drive shaft. The electric generator further includes a second rotating element comprising a second magnet array and mechanically coupled to the drive shaft and an armature comprising a first coil array and a second coil array, wherein the first rotating element is configured to rotate at a particular velocity relative to the first coil array, and the second rotating element is configured to rotate at the particular velocity relative to the second coil array.

20 Claims, 5 Drawing Sheets

(56) References Cited

U.S. PATENT DOCUMENTS

| | | | |
|---|---|---|---|
| 7,982,351 B2* | 7/2011 | Atallah | H02K 11/048 310/114 |
| 8,063,527 B2 | 11/2011 | Qu et al. | |
| 8,222,784 B2 | 7/2012 | Serra et al. | |
| 8,624,415 B2 | 1/2014 | Koenig | |
| 8,803,354 B2* | 8/2014 | Wamble, III | B60L 13/04 290/44 |
| 2006/0066110 A1 | 3/2006 | Jansen et al. | |
| 2006/0071575 A1 | 4/2006 | Jansen et al. | |
| 2006/0163963 A1 | 7/2006 | Flores, Jr. | |
| 2007/0086132 A1* | 4/2007 | Ravera | H02J 1/10 361/62 |
| 2008/0197730 A1* | 8/2008 | Himmelmann | B60K 6/26 310/83 |
| 2009/0072645 A1* | 3/2009 | Quere | H02K 7/116 310/114 |
| 2009/0289516 A1 | 11/2009 | Hopewell et al. | |
| 2010/0207474 A1 | 8/2010 | Osada et al. | |
| 2010/0326050 A1 | 12/2010 | Schilling et al. | |
| 2011/0024567 A1 | 2/2011 | Blackwelder et al. | |
| 2013/0181562 A1* | 7/2013 | Gieras | H02K 16/02 310/114 |
| 2013/0187501 A1* | 7/2013 | Theobald | H02K 16/00 310/114 |
| 2013/0228654 A1 | 9/2013 | Aubert et al. | |
| 2015/0042186 A1* | 2/2015 | Galvan | H02K 16/00 310/54 |
| 2015/0176560 A1 | 6/2015 | Harris | |
| 2015/0207377 A1 | 7/2015 | Linares | |
| 2015/0315980 A1* | 11/2015 | Edwards | H02K 16/00 60/772 |
| 2016/0087517 A1* | 3/2016 | Powell | H02K 7/11 310/103 |
| 2017/0104398 A1* | 4/2017 | Peng | H02K 3/28 |
| 2018/0003276 A1* | 1/2018 | Jebari | F03G 3/00 |
| 2018/0058243 A1* | 3/2018 | Auker | F01D 15/10 |
| 2018/0094589 A1* | 4/2018 | Auker | F01D 15/10 |

FOREIGN PATENT DOCUMENTS

| | | |
|---|---|---|
| WO | 2013099008 A1 | 7/2013 |
| WO | 2014150377 A1 | 9/2014 |

OTHER PUBLICATIONS

U.S. Appl. No. 15/286,185, by Bradley Eugene Auker et al., filed Oct. 5, 2016.

Extended Search Report from European counterpart Application No. 17189407.4, dated Jan. 31, 2018, 15 pgs.

Response to Search Report dated Jan. 31, 2018, from counterpart European Application No. 17189407.4, filed Oct. 9, 2018, 48 pp.

Examination Report from counterpart European Application No. 17189407.4, dated Feb. 7, 2019, 6 pp.

\* cited by examiner

MULTIPLE COIL ELECTRIC GENERATOR IN TURBINE ENGINE

TECHNICAL FIELD

This disclosure relates to the generation of electricity in turbine engines.

BACKGROUND

A turbine engine is a type of internal combustion engine that may drive an electric generator for converting mechanical power produced by the turbine engine to electrical power used by other components of a system. Some electric generators may include one or more sets of rotors and stators with each rotor in a particular set configured to rotate about a corresponding stator. The frequency and phase of the electricity generated by a set of rotors and stators may depend on the rotational speed of each rotor. In an electric generator with multiple sets of rotors and stators, the rotor from each set may rotate about the respective stator at a unique speed thereby causing a respective pair of magnet arrays and coil arrays associated with that particular set to generate electricity with a unique frequency and phase. Therefore, a generator with multiple sets of rotors and stators may produce electricity having multiple frequencies and multiple phases—a unique frequency and/or phase for each set of rotors and stators. As such, one or more additional components (e.g., power converters) may be required to reconcile the outputs from the multiple sets of rotors and stators into a single frequency and/or single phase.

SUMMARY

In some examples, the disclosure describes a turbine engine that includes a drive shaft and an electric generator including a first rotating element comprising a first magnet array and mechanically coupled to the drive shaft. The electric generator further includes a second rotating element comprising a second magnet array and mechanically coupled to the drive shaft and an armature comprising a first coil array and a second coil array, wherein the first rotating element is configured to rotate at a particular velocity relative to the first coil array, and the second rotating element is configured to rotate at the particular velocity relative to the second coil array.

In some examples, the disclosure describes a method that includes receiving, at a first rotating element of an electric generator of a turbine engine, via a drive shaft of the turbine engine, first mechanical power to cause the first rotating element to rotate at a particular velocity relative to a first coil array of the electric generator. The method further includes receiving, at a second rotating element of the electric generator, via the drive shaft, second mechanical power to cause the second rotating element to rotate at the particular velocity relative to a second coil array of the electric generator. The method further includes generating, at the first coil array and based on the first mechanical power, first electrical current. The method further includes generating, at the second coil array and based on the second mechanical power, second electrical current. The method further includes outputting, by an electrical output element of the electric generator, to an electrical load, the first electrical current and the second electrical current.

In some examples, the disclosure describes an electric generator module including a first rotating element comprising a first magnet array and configured to mechanically couple to a drive shaft of a turbine engine and receive first mechanical power from the drive shaft. The electric generator module further includes a second rotating element comprising a second magnet array and configured to mechanically couple to the drive shaft, and receive second mechanical power from the drive shaft. The electric generator module further includes an armature comprising a first coil array and a second coil array, wherein the first coil array is configured to produce a first alternating-current (AC) electrical current having a particular frequency and a particular phase, and the second coil array is configured to produce a second AC electrical current having the particular frequency and the particular phase of the first AC electrical current.

The details of one or more examples are set forth in the accompanying drawings and the description below. Other features, objects, and advantages will be apparent from the description and drawings, and from the claims.

DETAILED DESCRIPTION

In general, this disclosure describes techniques for implementing an electric generator that is configured to generate, using two or more magnet and coil arrays, an electrical output having a single frequency and a single phase. By designing the electrical generator in such a way as to uniquely control the rotational velocities of each of the multiple magnet and coil arrays, the frequency and phase of the electrical outputs from each of the multiple sets of magnet and coil arrays can be synchronized and therefore easily combined to produce an electrical output having a single phase and a single frequency. Therefore, unlike other generators that may rely on additional, and often external, components to produce an electrical output that has a single phase and frequency, the example generator may reconcile the outputs from the multiple magnet and coil arrays into a single electrical output without the use of any power converters or additional components.

Figure 1:
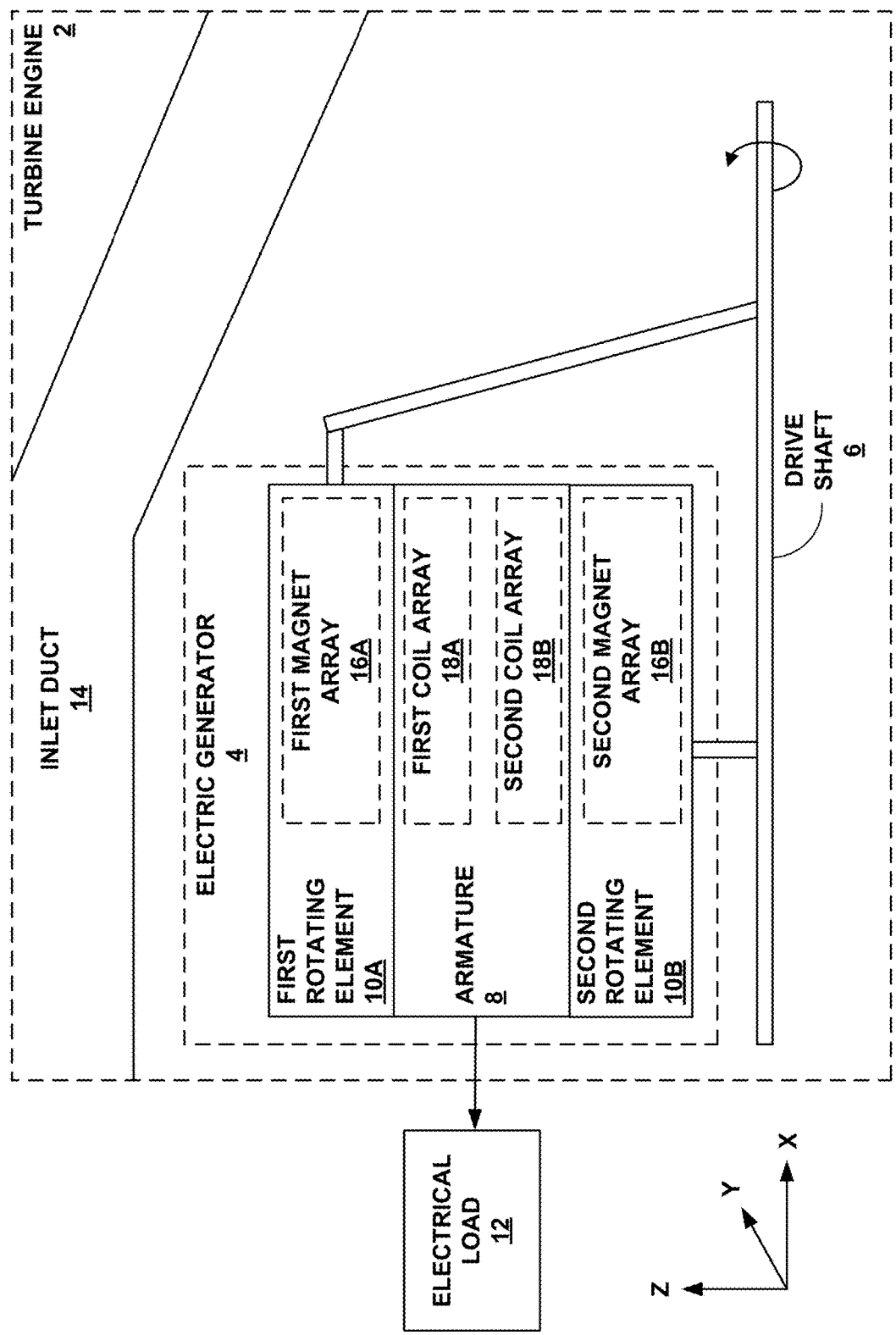
FIG. 1 is a conceptual diagram illustrating a turbine engine with an electric generator configured to generate, using two or more magnet and coil arrays, an electrical output having a single frequency and a single phase, in accordance with one or more techniques of this disclosure.

FIG. 1 is a conceptual diagram illustrating a turbine engine 2 with an electric generator 4 configured to generate, using two or more magnet and coil arrays, an electrical output having a single frequency and a single phase, in accordance with one or more techniques of this disclosure. Turbine engine 2 may be configured to convert one form of power to mechanical energy in the form of a rotating turbine. The mechanical energy produced by turbine engine 2 may be used in a variety of ways or for a variety of systems and applications (e.g., aircraft, locomotives, watercraft, power plants, electric generators, and any or all other systems and applications that rely on mechanical energy from a turbine engine to perform work).

Turbine engine 2 may include electric generator 4, drive shaft 6, and inlet duct 14, plus additional components not shown in FIG. 1. Turbine engine 2 may include a gas turbine engine, a nuclear turbine engine, a steam turbine engine, or any other suitable turbine engine. Turbine engine 2 may reside within a three-dimensional space represented by X, Y, and Z directions, as shown in FIG. 1. For example, drive shaft 6 may extend in the X direction, where the X-Y plane represents a horizontal plane. The Y direction may be at least partially into and out of the page in FIG. 1. As used herein, "top" or "upper" may refer to the positive Z direction, and "bottom" or "lower" may refer to the negative Z direction.

Drive shaft 6 is configured to rotate based on the rotation of a turbine in turbine engine 2. In some examples, drive shaft 6 may include a low-pressure (LP) shaft that is mechanically coupled to an LP turbine. Drive shaft 6 may include an auxiliary shaft that is mechanically coupled to the LP shaft. In some examples, one of rotating elements 10A, 10B may be mechanically coupled to the LP shaft or an auxiliary shaft coupled to the LP shaft, and the other of rotating elements 10A, 10B may be mechanically coupled to the HP shaft or an auxiliary shaft coupled to the HP shaft. Drive shaft 6 may be oriented in a horizontal direction, which is represented by the X direction in FIG. 1. The rotational velocity of drive shaft 6 may depend on the diameter of drive shaft 6 and the size of turbine engine 2.

Electrical load 12 is configured to receive electrical power (e.g., a voltage and a current) produced by electric generator 4. Electrical load 12 may reside within or outside of electric generator 4. In some examples, electrical load 12 may include at least two electrical loads coupled to a power bus. Electrical load 12 may include any type of electrical load, such as a fuel pump, a hydraulic pump, a cabin load, an interior lighting and display system, a heating and cooling system, or other loads added by the system designer.

Inlet duct 14 is configured to receive fluid such as air or another gas from intake 18. The fluid in inlet duct 14 (referred to in some examples as "core intake") may pass through a compressor for compression and later fuel injection. When the fluid from inlet duct 14 is combusted, it may cause the blades of a turbine (not shown in FIG. 1) within turbine engine 2 to rotate. The turbine may be attached to drive shaft 6, causing drive shaft 6 to rotate.

Electric generator 4 is configured to convert mechanical power to electrical power for use by other components or circuits. Electric generator 4 may include a direct-current (DC) generator or an alternating-current (AC) generator such as an induction generator. Electric generator 4 may include Halbach array generator with permanent magnets on a rotor. A Halbach array is an array of magnets that cancels, or nearly cancels, the magnetic field on one side of the array.

Electric generator 4 may include armature 8, first rotating element 10A, and second rotating element 10B. Each of rotating elements 10A, 10B may include one of magnet arrays 16A, 16B. Each of magnet arrays 16A, 16B may include at least one magnetic element, such as a permanent magnet and/or a field coil configured to operate as an electromagnet. Each of rotating elements 10A, 10B may be referred to as a "rotor" because rotating elements 10A, 10B may rotate relative to armature 8. In some examples, armature 8 may be referred to as a "coil support frame" or a "stator" because armature 8 may be stationary. In some alternative examples, one or more of coil arrays 18A, 18B in armature 8 may also rotate.

In some examples, the locations of magnet arrays 16A, 16B and coil arrays 18A, 18B may be reversed such that rotating elements 10A, 10B include coil arrays 18A, 18B and armature 8 includes magnet arrays 16A, 16B. Thus, coil arrays 18A, 18B may rotate about magnet arrays 16A, 16B. Coil arrays 18A, 18B in rotating elements 10A, 10B may produce electrical current based on the magnetic fields generated by magnet arrays 16A, 16B, which may pass through coil arrays 18A, 18B as coil arrays 18A, 18B rotate relative to magnet arrays 16A, 16B.

Each of rotating elements 10A, 10B may rotate at a particular angular velocity and a particular tangential velocity. The angular velocity of one of rotating elements 10A, 10B may be the amount of rotation of that rotating element in a period of time, possibly expressed as revolutions per minute or radians per second. The tangential velocity of one of rotating elements 10A, 10B may be the speed of a location on that rotating element at a specific time, possibly expressed as meters per second. In some examples, the tangential velocity of one of rotating elements 10A, 10B may refer to the tangential velocity of a center of one of the magnetic elements of magnet arrays 16A, 16B. The angular and tangential velocity of rotating element 10A or a magnetic element in rotating element 10A may be different than the angular and tangential velocity of rotating element 10B or a magnetic element in rotating element 10B. In some examples, the tangential velocity of a magnetic element in one of magnet arrays 16A, 16B may equal the angular velocity of that magnetic element multiplied by the radius of that magnetic element. Rotating element 10A may be a farther distance away from drive shaft 6, as compared to rotating element 10B. Rotating elements 10A, 10B may be referred to as the "upper rotating element" and the "lower rotating element," respectively.

Armature 8 may include coil arrays 18A, 18B, and each of coil arrays 18A, 18B may include at least one coil element. In some examples, the locations of magnet arrays 16A, 16B and coil arrays 18A, 18B may be reversed such that rotating elements 10A, 10B include coil arrays 18A, 18B and armature 8 includes magnet arrays 16A, 16B. Each coil element of coil arrays 18A, 18B may include an electrical winding, through which electrical current may flow. In some examples, coil arrays 18A, 18B on armature 8 may be configured to remain stationary or may be configured to rotate. Each coil element of coil arrays 18A, 18B may produce an electrical current with a frequency and a phase based on the electromagnetic fields generated by the magnetic elements of magnet arrays 16A, 16B. Coil arrays 18A, 18B in armature 8 may output the electrical currents to electrical load 12. Electric generator 4 may further include an electrical output element configured to deliver the electricity to electrical load 12. If electrical load 12 operates on a specific frequency or phase of electrical current, one or more optional power converters may convert the electrical current produced by coil arrays 18A, 18B to the specific frequency and phase of electrical current required by electrical load 12. The one or more optional power converters may be located inside or outside of turbine engine 2.

In accordance with the techniques of this disclosure, first rotating element 10A may be configured to rotate at a particular velocity relative to first coil array 18A, and second rotating element 10B may be configured to rotate at the same particular velocity relative to second coil array 18B. In some examples, "particular velocity" may refer to the tangential velocity or angular velocity of each magnetic element in magnet arrays 16A, 16B. For purposes of this disclosure, the same or equal velocity may mean that a slower velocity of two velocities is more than ninety percent as fast as the faster velocity of the two velocities. Turbine engine 2 may include components such as one or more gearboxes that cause rotating elements 10A, 10B to rotate at the same particular velocity. By configuring rotating elements 10A, 10B to rotate at the same particular velocity relative to coil arrays 18A, 18B, electrical generator 4 may cause coil arrays 18A, 18B may produce electrical currents with the same frequency and the same phase. As used herein, two or more current frequencies or two or more current phases may be considered the same or equal if a difference between the frequencies or a difference between the phases is less than or equal to an acceptable tolerance of the system. For example, in some cases, two electrical currents may be considered to have the same or equal frequency if the frequency of one of the two currents differs from the frequency of the other of the two currents by no more than ten percent (or some other acceptable tolerance). In some examples, two electrical currents may be considered to have the same or equal phase if the phases of the two currents are within ten degrees of each other or within some other acceptable tolerance.

By producing electrical currents with the same frequency and the same phase, electric generator 4 may not require additional power converters to reconcile the electrical outputs of coil arrays 18A, 18B. Therefore, turbine engine 2 may include fewer power converters and/or one or more simpler power converters that are configured to combine and output the electrical current produced by each of coil arrays 18A, 18B. Including fewer and/or simpler power converters, as compared to other turbine engines, may result in turbine engine 2 having a smaller volume and a smaller mass at lesser expense, as compared to other turbine engines. Electric generator 4 may produce more electrical power than a similarly sized electric generator with only one magnet array and only one coil array. For example, electric generator 4 of this disclosure rated at one megawatt may include rotating elements 10A, 10B with smaller radii than the radius of a single rotating element in an electric generator rated at one megawatt with only one rotating element.

Figure 2:
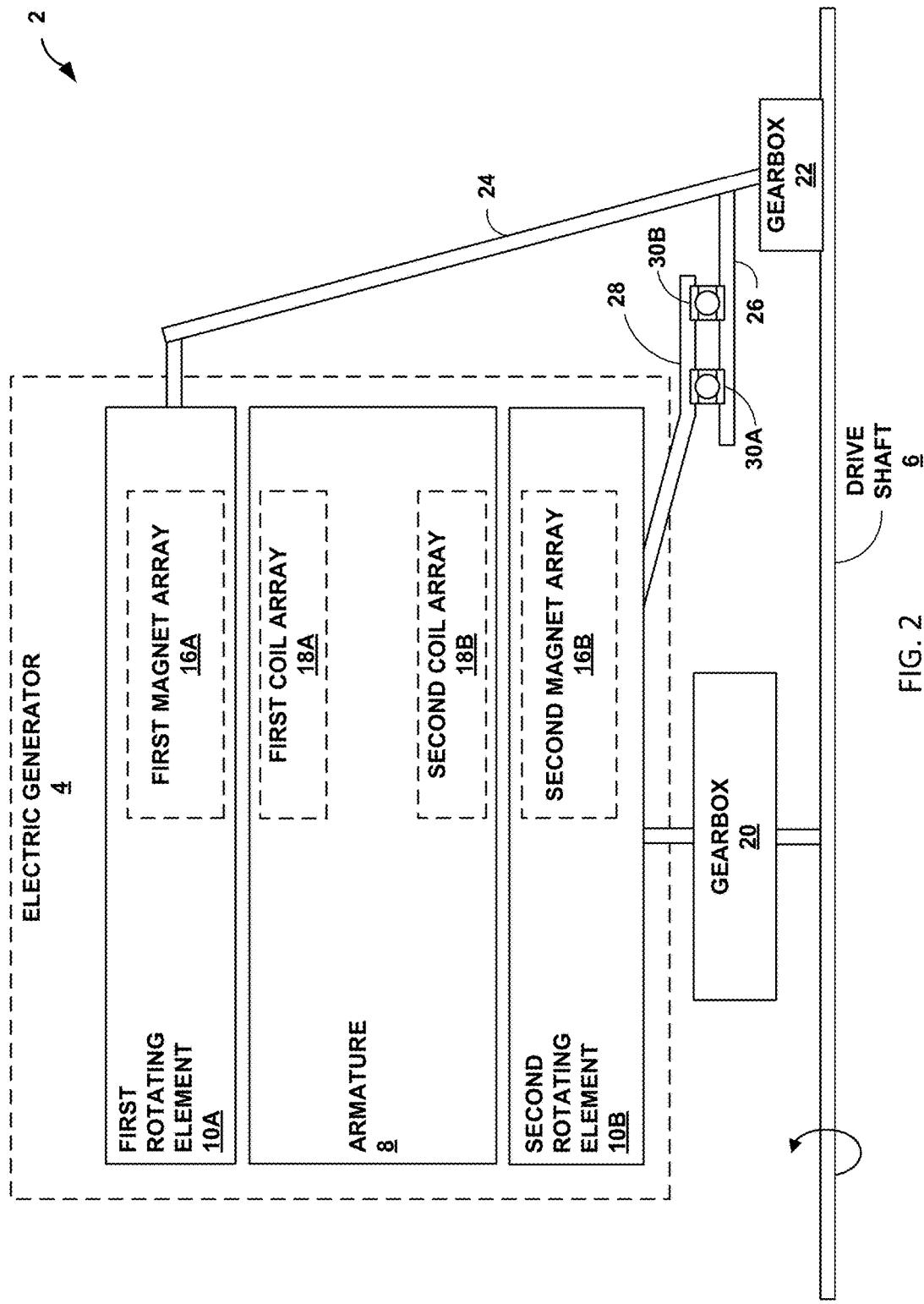
FIG. 2 is a conceptual diagram illustrating further details of the turbine engine of FIG. 1, which may include the mechanical coupling from a drive shaft to the electric generator, in accordance with one or more techniques of this disclosure.

FIG. 2 is a conceptual diagram illustrating further details of the turbine engine 2 of FIG. 1, which may include the mechanical coupling from a drive shaft 6 to the electric generator 4, in accordance with one or more techniques of this disclosure. In some examples, drive shaft 6 may be a low-pressure (LP) shaft of turbine engine 2 or an auxiliary shaft mechanically coupled to the LP shaft of turbine engine 2. The LP shaft may be connected to the LP turbine of turbine engine 2. The LP shaft may be a longer shaft than a high-pressure (HP) shaft of turbine engine 2 and may extend through a cooler section of turbine engine 2, as compared to the temperature of a section including the HP shaft.

Each of rotating elements 10A, 10B may be mechanically coupled to drive shaft 6 by at least one of gearboxes 20, 22. Each of gearboxes 20, 22 may include one or more gears configured to rotate based on the rotational speeds of drive shaft 6 and/or rotating elements 10A, 10B. In some examples, drive shaft 6 may be encased, and one or both of gearboxes 20, 22 may include a bolt. Through gearbox 20, drive shaft 6 may drive the rotation of rotating element 10B. Through gearbox 22 and shaft 24, drive shaft 6 may drive the rotation of rotating element 10A.

Rotating element 10B may also be mechanically coupled to drive shaft 6 through shafts 24, 26, 28, bearings 30A, 30B, and gearbox 22. Shaft 26 may rotate at a first velocity based on the rotation of shaft 24, and shaft 28 may rotate at a second velocity based on the rotation of rotating element 10B. Shafts 26, 28 and bearings 30A, 30B may cause the rotational velocity of rotating element 10B to increase such that the velocity of each magnet in magnet array 16B is equal to the velocity of each magnet in magnet array 16A. In some examples, the tangential velocity of magnet array 16B may be equal to the tangential velocity of magnet array 16A.

The distance from rotating element 10A to drive shaft 6 to may be longer than the distance from rotating element 10B to drive shaft 6. Given the longer distance from drive shaft 6 for rotating element 10A, rotating element 10A may have a slower angular velocity than rotating element 10B. To ensure that coil arrays 18A, 18B produce electrical current with equal frequencies, magnet array 16A may have a larger quantity of magnetic elements than the quantity of magnetic elements in magnet array 16B. Thus, each of the magnetic elements in magnet arrays 16A, 16B may pass over a coil element in coil arrays 18A, 18B with equal frequency.

Figure 3:
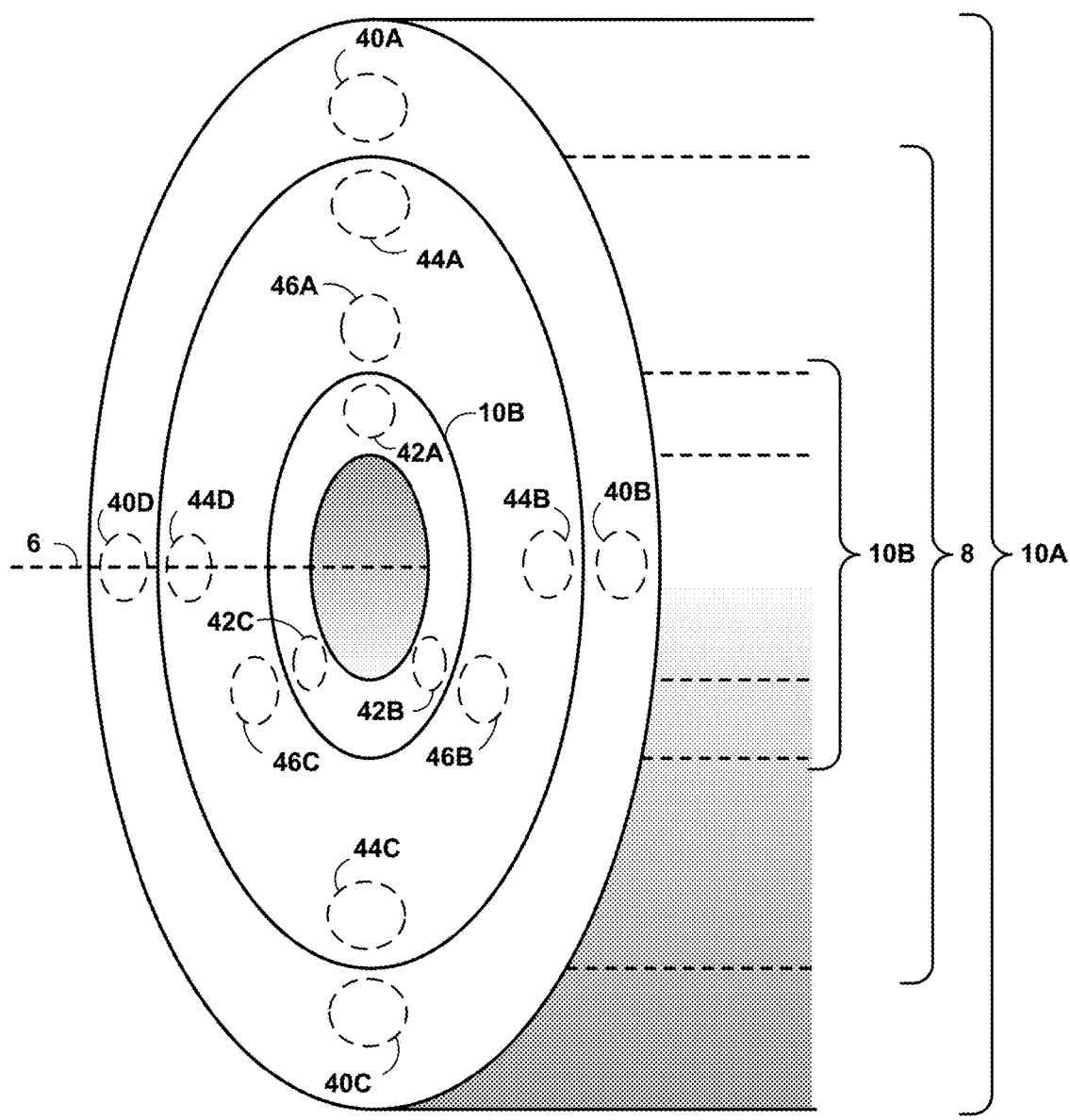
FIG. 3 is a conceptual diagram illustrating further details of the electric generator of FIGS. 1 and 2, which may include two magnet arrays and two coil arrays, in accordance with one or more techniques of this disclosure.

FIG. 3 is a conceptual diagram illustrating further details of the electric generator 4 of FIGS. 1 and 2, which may include magnet array 16A, which may include magnetic elements 40A-40D, magnet array 16B, which may include magnetic elements 42A-42C, coil array 18A, which may include coil elements 44A-44D, and coil array 18B, which may include coil elements 46A-46C, in accordance with one or more techniques of this disclosure. Magnet array 16A may be positioned adjacent to coil array 18A, and magnet array 16B may be positioned adjacent to coil array 18B. In some examples, the locations of magnet arrays 16A, 16B and coil arrays 18A, 18B may be reversed such that rotating elements 10A, 10B include coil arrays 18A, 18B and armature 8 includes magnet arrays 16A, 16B.

Each of rotating elements 10A, 10B may include one of magnet arrays 16A, 16B, each of which may include one or more magnetic elements 40A-40D, 42A-42C. Each of magnetic elements 40A-40D, 42A-42C may include a magnet and/or a field coil configured to operate as electromagnet. Magnetic elements 40A-40D, 42A-42C may be configured to generate an electromagnetic field that passes through coil elements 44A-44D, 46A-46C in armature 8. As the electromagnetic field passes through coil elements 44A-44D, 46A-46C, a current may flow through coil elements 44A-44D, 46A-46C, thereby generating electrical current. Each of rotating elements 10A, 10B may be referred to as a "rotor" because rotating elements 10A, 10B may rotate relative to armature 8. Rotating elements 10A, 10B may also be referred to as mechanical inputs configured to receive mechanical power from drive shaft 6.

Armature 8 may comprise two coil arrays 18A, 18B, each of which may include one or more coil elements 44A-44D, 46A-46C through which electrical current may flow based on an electromagnetic field generated by magnet arrays 16A, 16B. Armature 8 may be referred to as a "stator," even though armature 8 may not be stationary in some examples of this disclosure. Armature 8 may also be referred to as a power generation component. Armature 8 may be configured to produce electrical current from the mechanical power received by rotating elements 10A, 10B. Armature 8 may also be referred to as an electrical output. Armature 8 may output the electrical current through electrical wires to an electrical load.

The quantity of magnetic elements 40A-40D in magnet array 16A may be equal to the quantity of coil elements 44A-44D in coil array 18A. The quantity of magnetic elements 42A-42C in magnet array 16B may be equal to the quantity of coil elements 46A-46C in coil array 18B. Thus, when magnetic elements 40A-40D are passing over coil elements 44A-44D, magnetic elements 42A-42C may be passing over coil elements 46A-46C. Thus, the electrical current produced by each of the coil arrays will have an equal frequency and an equal phase and therefore be easier to combine as a single current output without the use of additional power converters or other equipment.

Figure 4:
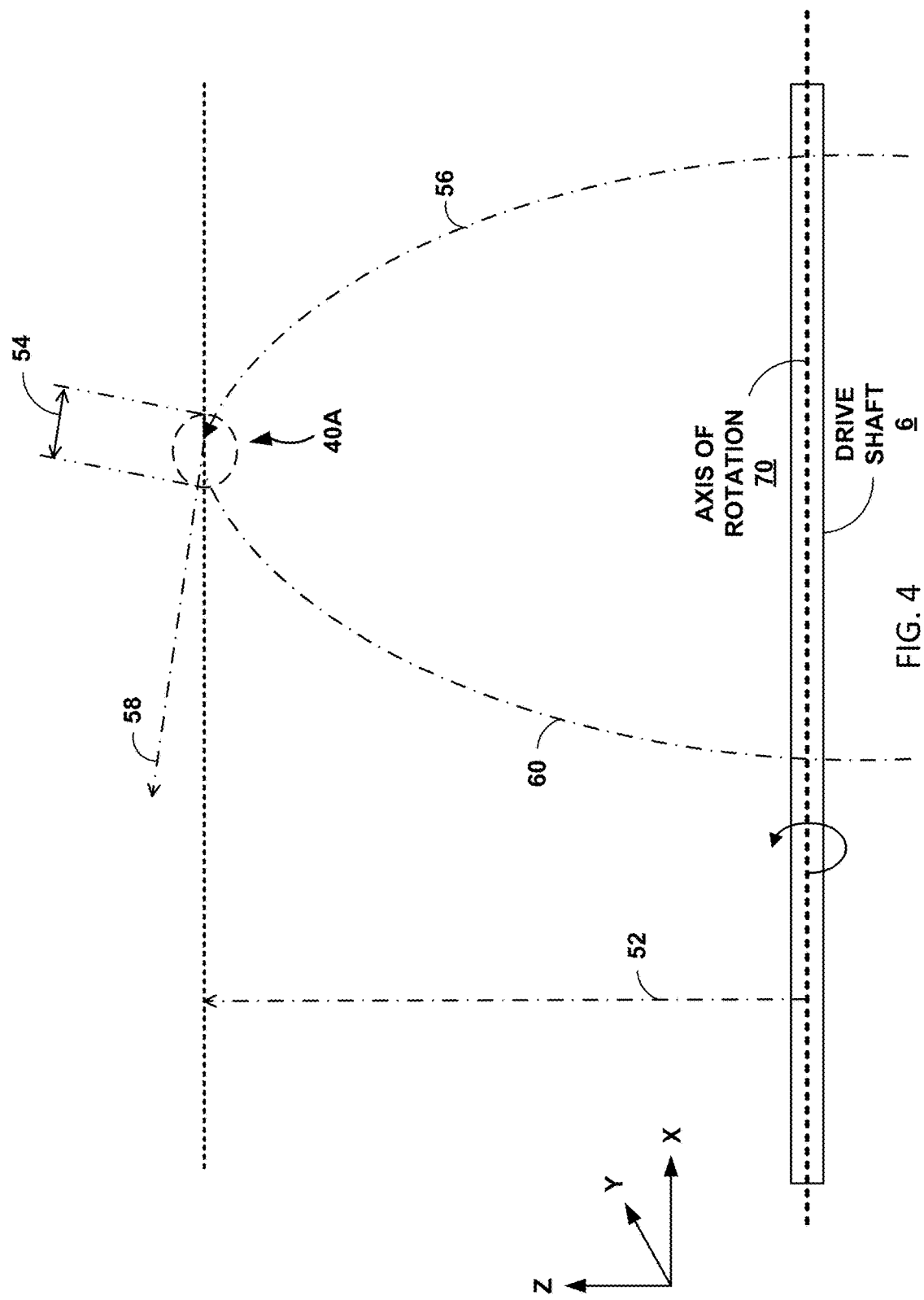
FIG. 4 is a conceptual diagram illustrating further details of a rotor of the electric generator of FIGS. 1-3, in accordance with one or more techniques of this disclosure.

FIG. 4 is a conceptual diagram illustrating further details of rotor 10A of electric generator 4 of FIGS. 1-3, in accordance with one or more techniques of this disclosure. In some examples, rotor 10A may be referred to as "rotating element 10A." Rotor 10A may have radius of rotation 52, which may be measured from axis of rotation 70 at the center of drive shaft 6 to a point on path of rotation 60. Path of rotation 60 may bisect each of magnetic elements 40A-40D in magnet array 18A.

Each of magnetic elements 40A-40D in magnet array 18A may have tangential width 54. Tangential width 54 may be measured across each of magnetic elements 40A-40D along path of rotation 60. Tangential width 54 may be equal for all of magnetic elements 40A-40D. Magnetic elements 42A-42C (shown in FIG. 3) may have the same tangential width 54 as magnetic elements 40A-40D. In some examples, each of coil elements 44A-44D of coil array 18A may have the same tangential width as each of coil elements 46A-46C of coil array 18B. If the tangential widths of each of magnetic elements 40A-40D, 42A-42C are equal, and the tangential widths of each of coil elements 44A-44D, 46A-46C are equal, and the relative velocities of magnetic elements 40A-40D, 42A-42C are equal, the rate at which the magnetic elements pass over the coil elements may be equal. Thus, the frequency of the electrical current produced by coil arrays 18A, 18B may be equal.

Rotor 10A may rotate about axis of rotation 70 at angular velocity 56, which may be expressed in revolutions per minute or radians per second. If a respective coil array, such as coil array 18A (shown in FIG. 3) also rotates, the relative angular velocity of rotor 10A may be the sum or difference of angular velocity 56 and the angular velocity of coil array 18A. Magnetic element 40A may travel with tangential velocity 58, which may be the product of angular velocity 56 and radius 52. If radius 52 is not equal to a radius of magnet array 16B, then angular velocity 56 may not be equal to the angular velocity of rotating element 10B.

Each of magnetic elements 40A-40D may have a similar or equal tangential velocity if radius 52 is the same for magnetic elements 40A-40D. If one or both of coil arrays 18A, 18B are rotating, the angular velocity of coil arrays 18A, 18B may be used to calculate the relative angular velocity of magnet arrays 16A, 16B. Electric generator 4 may generate electrical current from each of coil arrays 18A, 18B with equal frequencies because each magnetic element may pass over a coil element at the same time.

Figure 5:
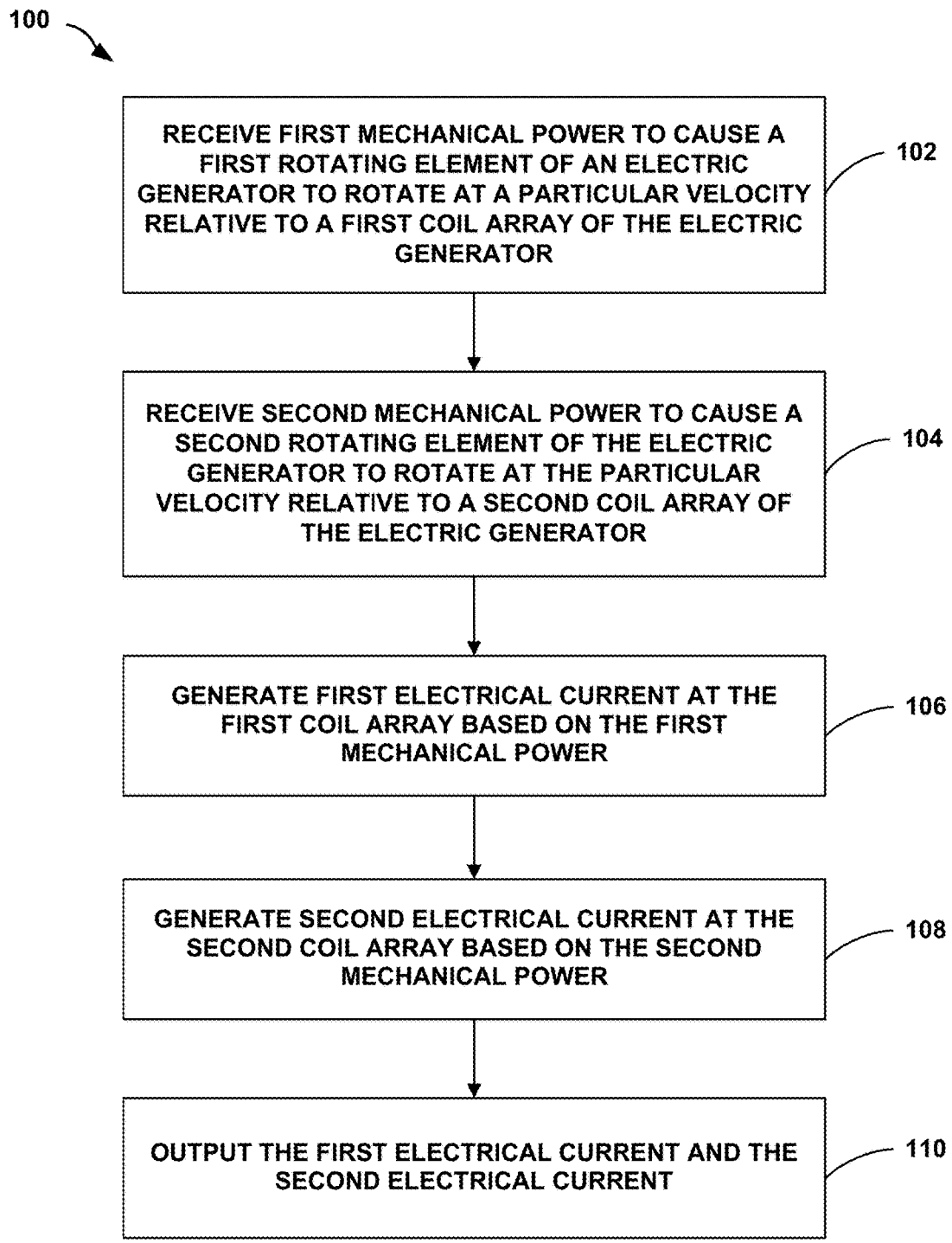
FIG. 5 is a flowchart illustrating an example process implemented by a system including a turbine engine with an embedded electric generator configured to generate, using two or more magnet and coil arrays, an electrical output having a single frequency and a single phase, in accordance with one or more techniques of this disclosure.

FIG. 5 is a flowchart illustrating an example process 100 implemented by a system including a turbine engine with an embedded electric generator configured to generate, using two or more magnet and coil arrays, an electrical output having a single frequency and a single phase, in accordance with one or more techniques of this disclosure. Operations 102-110 of process 100 are described in the context of electric generator 4 of FIGS. 1-3.

Process 100 includes receiving, at rotating element 10A of electric generator 4 of turbine engine 2, via drive shaft 6 of turbine engine 2, first mechanical power to cause rotating element 10A to rotate at a particular velocity relative to coil array 18A of electric generator 4 (102). For example, if turbine engine 2 is part of an aircraft system, turbine engine 2 may spin drive shaft 6 during pre-fight or in-flight operations to provide mechanical power to drive shaft 6. Rotating element 10A of electric generator 4, which may function as a rotor, may receive the mechanical power delivered to drive shaft 6.

Process 100 also includes receiving, at rotating element 10B of electric generator 4 of turbine engine 2, via drive shaft 6 of turbine engine 2, second mechanical power to cause rotating element 10B to rotate at the particular velocity relative to coil array 18B of the electric generator 4 (104). By configuring rotating elements 10A, 10B to rotate at the same particular velocity, each magnetic element of magnet arrays 16A, 16B may pass over a coil element of coil arrays 18A, 18B at the same time.

Process 100 also includes generating first electrical current at coil array 18A based on the first mechanical power received at rotating element 10A (106). For example, magnet array 16A of rotating element 10A may include a permanent magnet or an electromagnetic configured to induce an electrical current in a coil element of coil array 18A. The coil element of coil array 18A may generate first electrical power that has an AC electrical current generated from the electromagnetic field created by magnet array 16A.

Process 100 also includes generating second electrical current at coil array 18B based on the second mechanical power received at rotating element 10B (108). Magnet array 16B of rotating element 10B may include a permanent magnet or an electromagnetic configured to induce an electrical current in a coil element of coil array 18B. The coil element of coil array 18B may generate second electrical power that has an AC electrical current generated from the electromagnetic field created by magnet array 16B. The electrical current in coil array 18B may have the same frequency and phase as the electrical current in coil array 18A.

Process 100 also includes outputting the first electrical current and the second electrical current to electrical load 12 (110). For example, armature 8 may include an electrical wire for transmitting the electrical currents to electrical load 12, which may comprise a fuel pump, a hydraulic pump, a cabin load, an interior lighting and display system, and a heating and cooling system or any other component or system.

FIG. 5 has described the operation of electric generator 4 in general. In some examples, rotating elements 10A, 10B of electric generator 4 may include coil arrays 18A, 18B, and armature 8 may include magnet arrays 16A, 16B. If rotating elements 10A, 10B include coil arrays 18A, 18B and armature 8 includes magnet arrays 16A, 16B, electric generator 4 may produce electrical current at rotating elements 10A, 10B. A person having ordinary skill in the art will understand that process 100 is not the only example enabled by the techniques described in this disclosure, and that the systems described herein may combine the techniques described herein in other ways to operate in other operating modes.

As described in process 100, electric generator 4 may convert mechanical power to electrical current at coil arrays 18A, 18B. Each of rotating elements 10A, 10B may be configured to rotate at the same particular velocity relative to a respective coil array of coil arrays 18A, 18B. If rotating elements 10A, 10B rotate at the same particular velocity, each of coil arrays 18A, 18B may produce AC electrical current with the same frequency and same phase. For example, if coil array 18A produces AC electrical current at one kilohertz and zero phase offset, coil array 18B may produce AC electrical current at one kilohertz and zero phase offset. As a result, turbine engine 2 may not require additional power converters to reconcile the electrical output of each of coil arrays 18A, 18B.

In some examples, electric generator 4 may output a single electrical current that is a combination of the first electrical current produced by coil array 18A and the second electrical current produced by coil array 18B. In some examples, electric generator 4, or a circuit outside of electric generator 4, may combine the first electrical current and the second electrical current output from electrical generator 4 into a single electrical current. Combining the first electrical current and the second electrical current may be relatively simple and efficient because the first electrical current and the second electrical current may have equal frequency and equal phase.

The following numbered examples demonstrate one or more aspects of the disclosure.

Example 1

A turbine engine comprises a drive shaft and an electric generator, wherein the electric generator includes a first rotating element comprising a first magnet array and mechanically coupled to the drive shaft. The electric generator further includes a second rotating element comprising a second magnet array and mechanically coupled to the drive shaft and an armature comprising a first coil array and a second coil array, wherein the first rotating element is configured to rotate at a particular velocity relative to the first coil array, and the second rotating element is configured to rotate at the particular velocity relative to the second coil array.

Example 2

The turbine engine of example 1, wherein the first coil array is configured to produce a first AC electrical current having a particular frequency and a particular phase, and the second coil array is configured to produce a second AC electrical current having the particular frequency and the particular phase of the first AC electrical current.

Example 3

The turbine engine of any combination of examples 1 or 2, wherein a first tangential width of each magnetic element of the first magnet array is equal to a second tangential width of each magnetic element of the second magnet array.

Example 4

The turbine engine of any combination of examples 1 to 3, wherein a first tangential width of each coil element of the first coil array is equal to a second tangential width of each coil element of the second coil array.

Example 5

The turbine engine of any combination of examples 1 to 4, wherein the first coil array is positioned adjacent to the first magnet array, the second coil array is positioned adjacent to the second magnet array, a quantity of magnetic elements in the first magnet array is equal to a quantity of coil elements in the first coil array, and a quantity of magnetic elements in the second magnet array is equal to a quantity of coil elements in the second coil array.

Example 6

The turbine engine of any combination of examples 1 to 5, wherein the first rotating element is configured to rotate at a first angular velocity, the second rotating element is configured to rotate at a second angular velocity, a distance from the first rotating element to the drive shaft is longer than a distance from the second rotating element to the drive shaft, the first angular velocity is slower than the second angular velocity, and the quantity of magnetic elements in the first rotating element is more than the quantity of magnetic elements in the second rotating element.

Example 7

The turbine engine of any combination of examples 1 to 6, wherein the first rotating element is configured to rotate at a first angular velocity, the second rotating element is configured to rotate at a second angular velocity, and the first angular velocity of the first rotating element is not equal to the second angular velocity of the second rotating element.

Example 8

The turbine engine of any combination of examples 1 to 7, wherein a radius of the first coil array is not equal to a radius of the second coil array, and the first angular velocity of the first rotating element is not equal to the second angular velocity of the second rotating element.

Example 9

The turbine engine of any combination of examples 1 to 8, further comprising an LP shaft, wherein the drive shaft comprises the LP shaft or an auxiliary shaft mechanically coupled to the LP shaft.

Example 10

The turbine engine of any combination of examples 1 to 9, wherein the first rotating element is mechanically coupled to the drive shaft by at least a first gearbox; and the second rotating element is mechanically coupled to the drive shaft by at least a second gearbox.

Example 11

A method includes receiving, at a first rotating element of an electric generator of a turbine engine, via a drive shaft of the turbine engine, first mechanical power to cause the first rotating element to rotate at a particular velocity relative to a first coil array of the electric generator. The method further includes receiving, at a second rotating element of the electric generator, via the drive shaft, second mechanical power to cause the second rotating element to rotate at the particular velocity relative to a second coil array of the electric generator. The method further includes generating, at the first coil array and based on the first mechanical power, first electrical current. The method further includes generating, at the second coil array and based on the second mechanical power, second electrical current. The method further includes outputting, by an electrical output element of the electric generator, to an electrical load, the first electrical current and the second electrical current.

Example 12

The method of example 11, wherein generating the first electrical current comprises generating a first alternating-current (AC) electrical current having a particular frequency and a particular phase, and generating the second electrical current comprises generating a second AC electrical current having the particular frequency and the particular phase of the first AC electrical current.

Example 13

The method of any combination of examples 11 and 12, wherein a first tangential width of a first coil element of the first coil array is equal to a second tangential width of a second coil element of the second coil array.

Example 14

The method of any combination of examples 11 to 13, wherein a quantity of magnetic elements in a first magnet array of the first rotating element is equal to a quantity of coil elements in the first coil array; and a quantity of magnetic elements in a second magnet array of the first rotating element is equal to a quantity of coil elements in the second coil array.

Example 15

The method of any combination of examples 11 to 14, wherein a first tangential width of a first magnetic element of the first magnetic array of the first rotating element is equal to a second tangential width of a second magnetic element of the second magnetic array of the second rotating element.

Example 16

The method of any combination of examples 11 to 15, wherein outputting the first electrical current and the second electrical current comprises outputting a single electrical current that is a combination of the first electrical current and the second electrical current.

Example 17

An electric generator module includes a first rotating element comprising a first magnet array and configured to mechanically couple to a drive shaft of a turbine engine and receive first mechanical power from the drive shaft. The electric generator module further includes a second rotating element comprising a second magnet array and configured to mechanically couple to the drive shaft, and receive second mechanical power from the drive shaft. The electric generator module further includes an armature comprising a first coil array and a second coil array, wherein the first coil array is configured to produce a first alternating-current (AC) electrical current having a particular frequency and a particular phase, and the second coil array is configured to produce a second AC electrical current having the particular frequency and the particular phase of the first AC electrical current.

Example 18

The electric generator module of example 17, wherein the first rotating element is configured to rotate at a particular velocity relative to the first coil array, and the second rotating element is configured to rotate at the particular velocity relative to the second coil array.

Example 19

The electric generator module of any combination of examples 17 and 18, wherein a tangential width of each magnetic element of the first magnet array is equal to a tangential width of each magnetic element of the second magnet array, and a tangential width of each coil element of the first coil array is equal to a tangential width of each coil element of the second coil array.

Example 20

The electric generator module of any combination of examples 17 to 19, wherein a quantity of magnetic elements in the first magnet array is equal to a quantity of coil elements in the first coil array, and a quantity of magnetic elements in the second magnet array is equal to a quantity of coil elements in the second coil array.

Example 21

The electric generator module of any combination of examples 17 to 20, wherein the first rotating element is configured to rotate at a first angular velocity, the second rotating element is configured to rotate at a second angular velocity, a distance from the first rotating element to the drive shaft is longer than a distance from the second rotating element to the drive shaft, the first angular velocity is slower than the second angular velocity, and the quantity of magnetic elements in the first rotating element is more than the quantity of magnetic elements in the second rotating element.

Various examples have been described. These and other examples are within the scope of the following claims.

What is claimed is:
1. A turbine engine comprising:
    a drive shaft;
    a first gearbox;
    a second gearbox; and
    an electric generator comprising:
        a first rotating element comprising a first magnet array and mechanically coupled to the drive shaft by at least the first gearbox;
        a second rotating element comprising a second magnet array and mechanically coupled to the drive shaft by at least the second gearbox, wherein a distance from the first rotating element to the drive shaft is longer than a distance from the second rotating element to the drive shaft; and
        an armature comprising a first coil array and a second coil array, wherein the first gearbox is configured to cause the first rotating element to rotate at a first angular velocity and at a tangential velocity relative to the first coil array, and wherein the second gearbox is configured to cause the second rotating element to rotate at a second angular velocity and at the tangential velocity relative to the second coil array, the first angular velocity being different than the second angular velocity.

2. The turbine engine of claim 1, wherein:
the first coil array is configured to produce a first alternating-current (AC) electrical current having a particular frequency and a particular phase; and
the second coil array is configured to produce a second AC electrical current having the particular frequency and the particular phase of the first AC electrical current.

3. The turbine engine of claim 1, wherein a first tangential width of each magnetic element of the first magnet array is equal to a second tangential width of each magnetic element of the second magnet array.

4. The turbine engine of claim 1, wherein a first tangential width of each coil element of the first coil array is equal to a second tangential width of each coil element of the second coil array.

5. The turbine engine of claim 1, wherein:
the first coil array is positioned adjacent to the first magnet array;
the second coil array is positioned adjacent to the second magnet array;
a quantity of magnetic elements in the first magnet array is equal to a quantity of coil elements in the first coil array; and
a quantity of magnetic elements in the second magnet array is equal to a quantity of coil elements in the second coil array.

6. The turbine engine of claim 5, wherein:
the first angular velocity is slower than the second angular velocity; and
the quantity of magnetic elements in the first rotating element is more than the quantity of magnetic elements in the second rotating element.

7. The turbine engine of claim 1, wherein each magnetic element of the first magnet array is configured to pass over a respective coil element of the first coil array concurrently with each magnetic element of the second magnet array passing over a respective coil element of the second coil array.

8. The turbine engine of claim 1, wherein each magnetic element of the first magnet array is configured to pass over a respective coil element of the first coil array at a rate that is equal to a rate at which each magnetic element of the second magnet array passes over a respective coil element of the second coil array.

9. The turbine engine of claim 1, wherein each magnetic element of the magnetic elements in the first magnet array and each magnetic element of the magnetic elements in the second magnet array is configured to pass over a respective coil element in the first coil array or in the second coil array with equal frequency.

10. A method comprising:
receiving, at a first rotating element of an electric generator of a turbine engine, via a first gearbox coupled to a drive shaft of the turbine engine, first mechanical power to cause the first rotating element to rotate at a first angular velocity and at a tangential velocity relative to a first coil array of the electric generator;
receiving, at a second rotating element of the electric generator, via a second gearbox coupled to the drive shaft, second mechanical power to cause the second rotating element to rotate at a second angular velocity and at the tangential velocity relative to a second coil array of the electric generator, the first angular velocity being different than the second angular velocity, wherein a distance from the first rotating element to the drive shaft is longer than a distance from the second rotating element to the drive shaft;
generating, at the first coil array and based on the first mechanical power, first electrical current;
generating, at the second coil array and based on the second mechanical power, second electrical current; and
outputting, by an electrical output element of the electric generator, to an electrical load, the first electrical current and the second electrical current.

11. The method of claim 10, wherein:
generating the first electrical current comprises generating a first alternating-current (AC) electrical current having a particular frequency and a particular phase; and
generating the second electrical current comprises generating a second AC electrical current having the particular frequency and the particular phase of the first AC electrical current.

12. The method of claim 10, wherein a first tangential width of a first magnetic element of a first magnet array of the first rotating element is equal to a second tangential width of a second magnetic element of a second magnet array of the second rotating element.

13. The method of claim 10, wherein a first tangential width of a first coil element of the first coil array is equal to a second tangential width of a second coil element of the second coil array.

14. The method of claim 10, wherein:
a quantity of magnetic elements in a first magnet array of the first rotating element is equal to a quantity of coil elements in the first coil array; and
a quantity of magnetic elements in a second magnet array of the second rotating element is equal to a quantity of coil elements in the second coil array.

15. The method of claim 10, wherein:
the first angular velocity is slower than the second angular velocity; and
a quantity of magnetic elements in the first rotating element is more than a quantity of magnetic elements in the second rotating element.

16. A turbine engine comprising:
a drive shaft;
a first gearbox;
a second gearbox; and
an electric generator comprising:
a first rotating element comprising a first magnet array and mechanically coupled to the drive shaft by at least the first gearbox;
a second rotating element comprising a second magnet array and mechanically coupled to the drive shaft by at least the second gearbox, wherein a distance from the first rotating element to the drive shaft is longer than a distance from the second rotating element to the drive shaft; and
an armature comprising a first coil array and a second coil array,
wherein the first coil array is configured to produce a first alternating-current (AC) electrical current having a particular frequency and a particular phase,
the second coil array is configured to produce a second AC electrical current having the particular frequency and the particular phase of the first AC electrical current,
wherein each magnetic element of the first magnet array is configured to pass over a respective coil element of the first coil array concurrently with each magnetic element of the second magnet array passing over a respective coil element of the second coil array, wherein the first gearbox is configured to cause the first rotating element to rotate at a first angular velocity and at a tangential velocity relative to the first coil array, and wherein the second gearbox is configured to cause the second rotating element to rotate at a second angular velocity and at the tangential velocity relative to the second coil array, the first angular velocity being different than the second angular velocity.

17. The turbine engine of claim 16, wherein a first tangential width of each magnetic element of the first magnet array is equal to a second tangential width of each magnetic element of the second magnet array.

18. The turbine engine of claim 16, wherein a first tangential width of each coil element of the first coil array is equal to a second tangential width of each coil element of the second coil array.

19. The turbine engine of claim 16, wherein the first coil array is positioned adjacent to the first magnet array, wherein the second coil array is positioned adjacent to the second magnet array, wherein a quantity of magnetic elements in the first magnet array is equal to a quantity of coil elements in the first coil array, and wherein a quantity of magnetic elements in the second magnet array is equal to a quantity of coil elements in the second coil array.

20. The turbine engine of claim 19, wherein the first angular velocity is slower than the second angular velocity, and wherein the quantity of magnetic elements in the first rotating element is more than the quantity of magnetic elements in the second rotating element.

\* \* \* \* \*